United States Patent [19]

Shi et al.

[11] Patent Number: 5,914,290

[45] Date of Patent: Jun. 22, 1999

[54] DISTILLATE HYDROFINING CATALYST AND A PROCESS FOR THE PREPARATION OF THE SAME

[75] Inventors: Yahua Shi; Dadong Li; Xuefen Liu; Hong Nie; Xiaodong Gao; Yibing Ying, all of Beijing, China

[73] Assignees: China Petrochemical Corporation; Research Institute of Petroleum, both of Beijing, China

[21] Appl. No.: 08/884,814

[22] Filed: Jun. 30, 1997

[30] Foreign Application Priority Data

Jun. 28, 1996 [CN] China ................................. 96106724

[51] Int. Cl.⁶ .......................... B01J 23/30; B01J 23/755; B01J 27/12; B01J 27/132
[52] U.S. Cl. .......................... 502/228; 502/224; 502/229; 502/231; 502/305; 502/315; 502/335; 502/337
[58] Field of Search ..................................... 502/224, 228, 502/229, 231, 305, 315, 335, 337

[56] References Cited

U.S. PATENT DOCUMENTS 3,779,903  12/1973  Levinson ............................ 208/254 H
4,330,395   5/1982  Pott et al. .............................. 208/115

FOREIGN PATENT DOCUMENTS 85104438  6/1985  China .
941000478  7/1995  China .

*Primary Examiner*—Michael Lewis
*Assistant Examiner*—Alexander G. Ghyka
*Attorney, Agent, or Firm*—Ladas & Parry

[57] ABSTRACT

The present invention discloses a hydrofining catalyst. The catalyst has the following composition based on the total weight of the entire catalyst composition: 1–5%(wt.) nickel oxide, 12–35% (wt.) tungsten oxide, 1–9% (wt.) fluorine, and the balancing amount of composite alumina. Said composite alumina is composed of one or several kinds of micropore alumina and one or several kinds of macropore alumina, wherein the weight ratio of micropore alumina to macropore alumina is 75:25 to 50:50. The term "micropore alumina" in the context means the alumina in which the volume of the proe of diameter less than 80 angstrom occupies more than 95% of its total pore volume, while the term "macropore alumina" in the contest means the alumina in which the volume of the pore of diameter 60–600 angstrom occupies more than 70% of its total pore volume. The pore distribution mentioned above is determined by BET method of nitrogen adsorption at low temperature. This catalyst is especially suitable for the hydrofining of inferior distillates with high sulfur content and boiling range of 80–550° C.

13 Claims, No Drawings

5,914,290

DISTILLATE HYDROFINING CATALYST AND A PROCESS FOR THE PREPARATION OF THE SAME

FIELD OF THE INVENTION

The invention relates to a distillate hydrofining catalyst and a process for the preparation of the same. More specifically it relates to a distillate hydrofining catalyst containing nickel-tungsten and a process for the preparation of the same.

BACKGROUND OF THE INVENTION

A tendency of deterioration in the quality of crude oils is more serious all over the world in recent years. Sulfur, nitrogen and aromatic compound contents in petroleum products are increasing. Obviously, said situation is sharply unsuitable for the requirement of increasingly strict environmental regulations. Hydrogenation is well known as one of the most efficient ways to improve the qualities of petroleum products. The hydrofining catalyst has become the most important and critical factor for such process. For this reason, many large companies go all out to carry out the work on further improving the existing hydrofining catalysts, and various hydrofining catalysts of better performance have been developed.

Distillate hydrofining catalysts commonly comprise metals or metal oxides having hydrogenation activity, certain acidic carriers and assistants. The metal components which are usually used are Co—Mo or Ni—Mo. Recently hydrofining catalysts which use Ni—W as active components are more popular. Further reducing the metal component contents in such catalysts and modifying their carrier characteristics in order to make it more suitable for hydrofining of inferior oils are the researching directions.

U.S. Pat. No. 3,779,903 discloses a process for the preparation of a hydrofining catalyst. Alumina sol is dried and then calcined to produce an alumina carrier having a pore volume between 0.15–0.45 ml/g. After that, the obtained carrier is impregnated with an aqueous solution containing tungsten and nickel, and then dried and calcined to produce the catalyst comprising 10–18% (wt.) nickel oxide, 25–40% (wt.) tungsten oxide and 1–9% (wt.) fluorine. Said catalyst due to high metal, especially nickel, contents has unduly high cost.

U.S. Pat. No. 4,330,395 discloses a process for the preparation of a hydrofining catalyst. This process comprises drying the starting materials based on tungsten compound and aluminium compound; calcining the resultant product; impregnating it with nickle compound; and then sulfiding and fluorinating the resultant product with sulfur compound and fluorine compound. The same disadvantage of this catalyst is unduly high metal contents and its preparation is also complicated.

Chinese Patent CN85,104,438B discloses a process for preparing hydrogenation catalyst. The boehmite of high purity which is prepared by hydrolysis of alkoxyl aluminium or alkyl aluminium is used as the precursor of catalyst carrier and the obtained hydrofining catalyst contains 1–5% (wt.) nickel oxide, 12–35% (wt.) tungsten oxide and 1–9% (wt.) fluorine. This catalyst has low metal contents and high hydrogenation activity. However, the price of this precursor used as catalyst carrier is much higher, resulting in high catalyst cost.

In addition, Chinese Patent Application No. 9410047.8 discloses a catalyst which is suitable for hydrofining heavy distillates. This catalyst comprises 1–5% (wt.) nickel oxide, 15–38% (wt.) tungsten oxide and 1–9% (wt.) fluorine, and its carrier is a modified alumina obtained by treatment at high temperature using air and water vapor, the pore distribution of this alumina is centralized within the range between 60–200 angstrom, but its preparation process is complicated and the energy consumption is high.

Purpose of the Invention

A purpose of the invention is to provide a hydrofining catalyst with lower cost and higher activity which is suitable for hydrogenation of various distillates.

Another purpose is to provide a process for the preparation of such hydrofining catalyst.

BRIEF DESCRIPTION OF THE INVENTION

The catalyst of the present invention has the following composition based on the total weight of the entire catalyst composition: 1–5% (wt.) nickel oxide, 12–35% (wt.) tungsten oxide, 1–9% (wt.) fluorine, and the balancing amount of composite alumina as the carrier. Said composite alumina is composed of one or several kinds of micropore alumina and one or several kinds of macropore alumina, wherein the weight ratio of the micropore alumina to the macropore alumina is 75:25 to 50:50. The term "micropore alumina" in the context means the alumina wherein the volume of the pore of diameter less than 80 angstrom occupies more than 95% of its total pore volume, while the term "macropore alumina" in the context means the alumina wherein the volume of the pore of diameter 60–600 angstrom occupies more than 70% of its total pore volume. The pore distribution mentioned above is determined by BET method of nitrogen adsorption at low temperature (the same as follows).

The process for the preparation of the catalyst of the present invention runs as follows:

The precursor of the micropore alumina and the precursor of the macropore alumina in the required ratio are uniformly mixed. Said ratio should ensure the mixture of the precursors after shaping and calcining (ie, on dry basis) to meet the predetermined ratio of the micropore alumina to the macropore alumina in the catalyst (ie, 75:25–50:50). The obtained mixture is shaped and calcined to obtain the composite alumina as the carrier, and the obtained composite alumina is impregnated sequentially with an aqueous solution containing fluorine and an aqueous solution containing nickel-tungsten, dried and calcined after being impregnated each time to obtain the catalyst of the present invention.

DETAILED DESCRIPTION OF THE INVENTION

The composition of the catalyst according to the present invention is as follows: based on the total weight of the entire catalyst composition, 1–5% (wt.) nickel oxide, 12–35% (wt.) tungsten oxide, 1–9% (wt.) fluorine, and the balancing amount of composite alumina as the carrier. Said composite alumina is composed of one or several kinds of micropore alumina and one or several kinds of macropore alumina. Said composite alumina is preferably composed of one kind of micropore alumina and one kind of macropore alumina. The weight ratio of the micropore alumina to the macropore alumina depends on the specific distillate to be treated. Increasing the amount of the micropore alumina can be adopted when a light distillate is processed; while a heavy distillate is processed, increasing the amount of the macropore alumina can be adopted. When the distillate having boiling range of 80–550° C. is hydrofined, the weight ratio of the micropore alumina to the macropore alumina should be: 75:25 to 50:50, in this case, the composite alumina preferably has the following pore distribution: the volume of the pore of diameter 40–100 angstrom occupies more than 75% of the total pore volume.

The composite alumina in the catalyst according to the present invention has the conventional specific surface area and the pore volume of the catalyst carrier generally used for the preparation of hydrofining catalyst. Its specific surface area is preferably more than 200 $m^2/g$, more preferably more than 220 $m^2/g$, and its pore volume is preferably more than 0.3 ml/g, more preferably more than 0.4 ml/g.

The detailed procedures for the preparation of this catalyst are as follows:

1. Carrier preparation

The precursor of the micropore alumina and the precursor of the macropore alumina in the required ratio are uniformly mixed. The obtained mixture is shaped by the conventional shaping method for the hydrofining catalyst, and then subjected to a calcination treatment at 550–650° C. for 3–5 hours to obtain the composite alumina as the carrier.

2. Fluorine impregnation:

The above-obtained composite alumina is impregnated with an aqueous solution containing fluorine, then dried at 100–130° C., and calcined for 3–5 hours at 400–600° C.

3. Nickel-tungsten impregnation:

The above-obtained composite alumina containing fluorine is impregnated with an aqueous solution containing nickel and tungsten, then dried at 100–130° C. and calcined for 3–5 hours at 400–600° C.

The precursor of the micropore alumina described above is preferably the hydrated alumina with the boehmite content more than 60% (wt.), which is prepared preferably by sodium metal-aluminate-carbon dioxide method; while the precursor of the macropore alumina described above is preferably hydrated alumina with boehmite content more than 50% (wt.), which is prepared preferably by sodium metal-aluminate-aluminium sulfate method.

The conventional shaping method above-mentioned includes tabletting, balling and extruding, wherein the method of extruding is preferred.

Said aqueous solution containing fluorine refers to the aqueous solution of fluorine-containing inorganic compound (s) such as, ammonium fluoride and/or hydrogen fluoride.

Said aqueous solution containing tungsten and nickel generally refers to the mixed aqueous solution of ammonium meta-tungstate, ammonium tungstate, ammonium ethyl meta-tungstate or nickel meta-tungstate and nickel nitrate or nickel acetate.

The most remarkable technical feature of the invention is the inventive combination of two kinds of alumina and the sufficient utility of said composite alumina having special pore distribution to prepare the carrier suitable for the distillate hydrofining catalyst. Although the macropore alumina is advantageous to the diffusion of the large molecular reactants and products and suitably used as the carrier for the distillate hydrofining catalyst, it is well known that the too large pore size will be disadvantageous to the strength of the catalyst. While the micropore alumina will be disadvantageous to the diffusion of the reactants and products, but it just makes up for the shortcomings of the macropore alumina mentioned above, thus synergistic effect is realized by the inventive combination of two kinds of alumina and sufficient utility of the properties of composite alumina as the carrier with the special pore distribution. The present invention not only maintains the advantages of the low metal contents in the catalyst disclosed by CN 85104438B, but also can flexibly adjust the characteristics of the catalyst carrier by varying the contents of the two kinds of alumina of different pore distribution in the carrier in order to be suitable for the hydrofining process for various distillates.

The catalyst of the present invention has higher catalytic activity than the catalysts in the prior art owing to the use of said composite alumina as the carrier. For example, the catalyst prepared by using said composite alumina wherein the weight ratio of the micropore alumina to the macropore alumina is 70:30 possesses higher desulfurization and denitrogenation activity and hydrogenation activity for aromatic compounds than the catalyst disclosed in CN85104438B. While the catalyst of the present invention is used in hydrofining of inferior distillates with high sulfur content, it still possesses higher catalytic activity than the catalyst in the prior art.

Moreover, the cost of the catalyst carrier of the present invention has been sharply reduced, since the price of the hydrated alumina prepared by the sodium meta-aluminate-carbon dioxide method is only equal to about one ninth of that of the hydrated alumina prepared by hydrolysis of alkoxyl aluminium or alkyl aluminium, or by sodium meta-aluminate -aluminium sulfate method. In other words, the cost of the catalyst carrier prepared by shaping and calcining the mixture of two kinds of the hydrated alumina in the required ratio, has greatly reduced in comparison with that of the catalyst carrier disclosed by CN 85104438B.

The catalyst of the present invention is especially suitable for the hydrofining of distillates with 80–500° C. boiling range. The catalyst of the present invention in combination with hydrocracking catalyst is suitable for hydrogenation modification of heavy distillates, particularly suitable for hydrogenation modification process at the medium pressure.

When the catalyst of the present invention is used for the distillate hydrofining, the process conditions of the conventional hydrofining can be used, for example, the reaction temperature is 200–500° C., preferably 300–400° C., the reaction pressure is 2–24 MPa, preferably 3–15 MPa; the liquid hourly space velocity (LHSV) is 0.1–30 $hour^{-1}$, preferably 0.2–10 $hour^{-1}$; hydrogen/oil volume ratio is 50–5000, preferably 200–1000.

EXAMPLES

The following examples further illustrate the present invention, but are not going to limit the present invention.

Examples 1–5

These examples illustrate the preparation method of the catalyst carrier of the present invention.

The precursor of the micropore alumina used in these examples is a commercial product prepared by sodium meta-aluminate-carbon dioxide method (the first kind of hydrated alumina), which is so-called Dried Pseudo-Boehmite available from Shandong Province Aluminium Factory, China, containing 80% (wt.) boehmite and 5% (wt.) bayerite. The specific surface area and pore distribution of the micropore alumina (B) obtained after being calcined for 4 hours at 550° C. are listed in Table 1. The precursor of the macropore alumina used in these examples is a commercial product prepared by sodium meta-aluminate-aluminium sulfate method (the second kind of hydrated alumina), which is so-called Changling Xerogel Powder, available from the Catalyst Plant of the Changling Petroleum Refinery, China, containing 68% (wt.) boehmite and 5% (wt.) bayerite. The specific surface area and pore distribution of the macropore alumina (C) obtained after being calcined for 4 hours at 550° C. are listed in Table 1. These two kinds of hydrated alumina in the required weight ratio (see Table 1) are uniformly mixed and thereto the appropriate amounts of extruding aid, binding agent and water are added, then the obtained mixture is extruded into trilobular bars with the circumscribed circle diameter of 1.4 mm, subsequently dried at 120° C. and calcined for 4 hours at 550–650° C. to obtain composite alumina D–H as the carrier, respectively. Their specific surface area and pore distribution data determined by using BET method of nitrogen adsorption at low temperature are listed in Table 1.

TABLE 1

| Example No. | | 1 | 2 | 3 | 4 | 5 |
|---|---|---|---|---|---|---|
| Alumina No. | B | C | D | E | F | G | H |
| First hydrated Alumina/Second hydrated Alumina (wt/wt, on dry basis) | — | — | 75:25 | 75:25 | 75:25 | 70:30 | 50:50 |
| Calcining Temperature, ° C. | 550 | 550 | 620 | 550 | 650 | 550 | 550 |
| Calcining Time, hr | 4 | 4 | 4 | 4 | 4 | 4 | 4 |
| Specific Surface area, m$^2$/g | 236 | 262 | 236 | 248 | 217 | 232 | 228 |
| Pore Volume, ml/g | 0.40 | 0.63 | 0.49 | 0.49 | 0.49 | 0.49 | 0.52 |
| Pore Distribution, angstrom, % | | | | | | | |
| 20–40 | 13.0 | 0.9 | 5.9 | 8.2 | 4.1 | 5.6 | 3.4 |
| 40–60 | 54.1 | 19.9 | 24.2 | 41.7 | 18.7 | 23.6 | 18.1 |
| 60–80 | 30.6 | 49.9 | 60.1 | 42.2 | 66.9 | 60.9 | 60.1 |
| 80–100 | 0.8 | 15.5 | | | | | |
| 100–600 | 1.5 | 13.8 | 9.8 | 7.8 | 10.3 | 9.9 | 18.4 |

Comparative Example 1

200 g (on dry basis) of hydrated alumina containing 85% (wt.) boehmite (tradename "SB", made by the Condea Company, Germany) prepared by the hydrolysis of alkoxyl aluminium is mixed with the appropriate amounts of extruding aid, binding agent and water and then extruded into trilobular bars with circumscribed circle diameter of 1.4 mm, subsequently dried at 120° C. and calcined for 4 hours at 550° C. to obtain catalyst carrier A. Catalyst carrier A has a specific surface area of 232 m$^2$/g and a pore volume of 0.47 ml/g. Its pore distribution is as follows: the volume of pore of diameter between 20–40 angstrom occupies 7.4% of its total pore volume, the volume of pore of diameter between 40–80 angstrom occupies 84.2% of its total pore volume, the volume of pore of diameter between 80–100 angstrom occupies 6.8% of its total pore volume and the volume of pore of diameter between 100–600 angstrom occupies 1.6% of its total pore volume. These data are determined by the BET method of nitrogen adsorption at low temperature (the same as follows).

Examples 6–16

These examples illustrate the preparation method of the catalyst of the present invention.

A certain amount of composite alumina D–H prepared in Examples 1–5 is weighted respectively, and then impregnated with a certain amount of the aqueous solution containing ammonium fluorine (chemically pure) for 1 hour, then dried at 120° C. and subsequently calcined at the different temperature for 4 hours to obtain composite alumina containing fluorine. Table 2 shows the amounts of each material, calcining temperature and time duration.

The composite alumina carrier containing fluorine is impregnated with a certain amount of the mixed aqueous solution containing ammonium meta-tungstate (chemically pure) and nickel nitrate (chemically pure) for 4 hours, then dried at 120° C. and subsequently calcined at the different temperature for 4 hours to obtain Catalyst I–S. Table 3 shows the amounts of each material, calcining temperature and time duration. Table 4 shows the active component contents of the catalyst, wherein the measurement method of the contents of NiO and WO$_3$ is described in "Petrochemical Analysis Methods (RIPP Test Methods)", published in the Science Press (1990), p. 360–361. The measurement method of fluorine content is described in the same book, p. 185–187.

Comparative Example 2

This comparative example illustrates the preparation method of the comparative catalyst.

A certain amount of catalyst carrier A prepared in Comparative Example 1 is weighted as the carrier and Catalyst It is prepared by the same method as Examples 6–16, wherein the amounts of each material, the calcining temperature and time duration, and the active component contents of the catalyst are respectively listed in Tables 2–4.

TABLE 2

| | | Fluorine Impregnation | | Calcining Conditions | |
|---|---|---|---|---|---|
| Example No. | Carrier No. | NH$_4$F amount, g | Water Amount, ml | Temp. ° C. | Time Duration, hr |
| 6 | D | 50 | 6.0 | 33 | 530 | 4 |
| 7 | E | 200 | 22.6 | 132 | 530 | 4 |
| 8 | E | 50 | 6.0 | 33 | 450 | 4 |
| 9 | E | 50 | 6.0 | 33 | 500 | 4 |
| 10 | E | 50 | 6.0 | 33 | 530 | 4 |
| 11 | E | 50 | 6.0 | 33 | 530 | 4 |
| 12 | E | 50 | 6.0 | 33 | 530 | 4 |
| 13 | E | 50 | 12.6 | 33 | 530 | 4 |
| 14 | F | 50 | 6.0 | 33 | 530 | 4 |
| 15 | G | 200 | 22.6 | 132 | 530 | 4 |
| 16 | H | 200 | 22.6 | 132 | 530 | 4 |
| Comparative Ex. 2 | A | 200 | 30.0 | 120 | 530 | 4 |

TABLE 3

| | Nickle-Tungsten Impregnation | | | | |
|---|---|---|---|---|---|
| Example No. | Nickle Nitrate Amount, g | Ammonium Meta-tungstate Amount, g | Water Amount, ml | Calcining Conditions Temp. °C. | Time Duration, hr |
| 6 | 60 | 17.5 | 32 | 500 | 4 |
| 7 | 24.2 | 70.0 | 128 | 500 | 4 |
| 8 | 6.0 | 17.5 | 32 | 500 | 4 |
| 9 | 6.0 | 17.5 | 30 | 500 | 4 |
| 10 | 6.0 | 17.5 | 32 | 420 | 4 |
| 11 | 6.0 | 17.5 | 32 | 480 | 4 |
| 12 | 11.7 | 10.8 | 32 | 500 | 4 |
| 13 | 4.3 | 27.4 | 32 | 500 | 4 |
| 14 | 6.0 | 17.5 | 32 | 420 | 4 |
| 15 | 24.2 | 70.0 | 128 | 500 | 4 |

TABLE 3-continued

Nickle-Tungsten Impregnation

| Example No. | Nickle Nitrate Amount, g | Ammonium Meta-tungstate Amount, g | Water Amount, ml | Calcining Conditions Temp. °C. | Time Duration, hr |
|---|---|---|---|---|---|
| 16 | 24.2 | 70.0 | 128 | 500 | 4 |
| Comparative Ex. 2 | 27.2 | 80.0 | 120 | 500 | 4 |

TABLE 4

| | | Catalyst Active Component Contents (wt %) | | |
|---|---|---|---|---|
| Example No. | Catalyst No. | $WO_3$ | NiO | F |
| 6 | I | 22.0 | 2.3 | 4.0 |
| 7 | J | 21.3 | 2.3 | 4.0 |
| 8 | K | 22.0 | 2.3 | 3.9 |
| 9 | L | 22.1 | 2.3 | 3.9 |
| 10 | M | 22.0 | 2.3 | 4.1 |
| 11 | N | 21.9 | 2.3 | 4.0 |
| 12 | O | 14.0 | 4.8 | 2.0 |
| 13 | P | 30.0 | 1.5 | 7.6 |
| 14 | Q | 21.8 | 2.3 | 3.9 |
| 15 | R | 22.0 | 2.3 | 4.0 |
| 16 | S | 22.0 | 2.3 | 4.0 |
| Comparative No. 2 | T | 24.5 | 2.5 | 4.5 |

Examples 17–27

These examples illustrate the hydrogenation activity for toluene of the catalyst of the present invention.

The evaluation on the hydrogenation activity of the catalysts, of the invention is carried out in the small size fixed-bed reactor, using n-hexane solution containing 50% (wt.) toluene as feedstock, with catalyst loading amount of 1.5 g (catalyst particle size is between 40–60 mesh). Catalysts I–S are added to the reactor respectively, then pre-sulfided under hydrogen atmosphere at 300° C. by cyclohexane solution containing 3% (wt.) carbon disulfide for 2 hours. After that, the feedstock is fed into the reactor to carry out the reaction for 3 hours at 360° C. temperature, 4.1 MPa pressure, 3.4 hour$^{-1}$ liquid hourly space velocity (LHSV) and 400/1 hydrogen/oil volume ratio. After reaction, the resultants are analyzed by the on-line gas chromatography. The results are listed in Table 5.

Comparative Example 3

This comparative example illustrates the hydrogenation activity for toluene of the comparative catalyst.

The feedstock and method used for the evaluation on its activity are the same as those of Examples 17–27, but the catalyst used in Catalyst T prepared in Comparative Example 2. The results are listed in Table 5.

TABLE 5

| Example No. | Catalyst | Toluene Conversion, wt % |
|---|---|---|
| 17 | I | 34.9 |
| 18 | J | 35.6 |
| 19 | K | 34.7 |
| 20 | L | 35.6 |
| 21 | M | 38.0 |
| 22 | N | 33.5 |
| 23 | O | 33.0 |
| 24 | P | 36.2 |
| 25 | Q | 35.2 |
| 26 | R | 32.1 |
| 27 | S | 33.0 |
| Comparative Ex. 3 | T | 31.0 |

From the results shown in Table 5, it is obvious that the hydrogenation activity for toluene of the catalyst of the present invention is higher than that of the comparative catalyst under the same reaction conditions and in the same range of the active component contents of the catalysts.

Examples 28–29

These examples illustrate the desulfurization and denitrogenation activity of the catalyst of the present invention.

The evaluation on the desulfurization and denitrogenation activity of the Catalyst J is carried out in the medium size hydrogenation unit. The catalyst loading amount is 100 ml, and catalyst length ranges from 2 mm to 3 mm. The catalytic cracked diesel oil whose boiling range is 186–350° C. is employed as feedstock. Before reaction, the catalyst is presulfided for 3 hours at 300° C. under hydrogen atmosphere, with a straight run kerosine containing 2% (wt.) carbon disulfide. After that, the feedstock is introduced, and the reaction is carried out under the following conditions: reaction temperature 330° C. and 350° C., hydrogen partial pressure 3.2 MPa, LHSV 2.0 hr$^{-1}$, hydrogen/oil volume ratio 350. The sulfur content in the product is determined by coulometric analysis, and the nitrogen content in the product is determined by chemiluminescence method. The results are listed in Table 6.

Comparative Examples 4–5

These two comparative examples illustrate the desulfurization and denitrogenation activity of the comparative catalyst.

The evaluation method and feedstock are the same as those of Examples 28–29, but Catalyst T prepared in Comparative Example 2 is used. The reaction results are listed in Table 6.

TABLE 6

| | Example 28 | Example 29 | Comparative Ex. 4 | Comparative Ex. 5 |
|---|---|---|---|---|
| Catalyst No. | J | J | T | T |
| Reaction Temp., ° C. | 330 | 350 | 330 | 350 |
| Nitrogen Content, ppm | | | | |
| Feedstock | 851 | 851 | 851 | 851 |
| Product | 204 | 129 | 226 | 167 |
| Denitrogenation rate, % | 76.0 | 84.8 | 73.4 | 80.4 |
| Sulfur Content, ppm | | | | |
| Feedstock | 4716 | 4716 | 4716 | 4716 |
| Product | 280 | 79 | 370 | 185 |
| Desulfurization rate, % | 94.1 | 98.3 | 92.2 | 96.1 |

The results shown in Table 6 illustrate that the catalyst of the present invention has higher desulfurization and denitrification activity than the comparative catalyst.

Examples 30–32

These examples illustrate the hydrofining performance of the catalyst of the present invention with respect to distillates having high sulfur content.

The catalyst used, its loading amount, reactor and the catalyst presulifidation method are the same as those of Examples 28–29, but the reaction feedstock selected is straight run diesel oil of medium quality from Saudi Arabia (the boiling range is within 235–366° C.). The reaction temperature is 330° C., 340° C. and 350° C., respectively, the hydrogen partial pressure is 3.2 MPa, LHSV is 2.0 hour$^{-1}$, hydrogen/oil volume ratio is 400. The reaction results are listed in Table 7.

Comparative Examples 6–8

These two comparative examples illustrate the hydrofining performance of the comparative catalyst with respect to distillates having high sulfur content.

The evaluation method and selected feedstock are the same as those of Examples 30–32, but the catalyst selected is Catalyst T prepared in Comparative Example 2. The reaction results are listed in Table 7.

TABLE 7

| | Example 30 | Example 31 | Example 32 | Comparative Ex. 6 | Comparative Ex. 7 | Comparative Ex. 8 |
|---|---|---|---|---|---|---|
| Catalyst | J | J | J | T | T | T |
| Reaction Temp. ° C. | 330 | 340 | 350 | 330 | 340 | 350 |
| Sulfur Content in Feedstock, ppm | 12784 | 12784 | 12784 | 12784 | 12784 | 12704 |
| Sulfur Content in Product, ppm | 604 | 221 | 59 | 1084 | 514 | 153 |
| Desulfurization Rate, % | 95.2 | 98.3 | 99.5 | 91.5 | 96.0 | 98.8 |

The results shown in Table 7 illustrate that when the catalyst of the present invention is used for hydrofining of distillates having sulfur content up to 12784 ppm, it obviously has higher activity than the comparative catalyst at each reaction temperature. It indicates that the catalytic activity of the catalyst of the present invention is superior to that of the prior art catalyst not only with respect to the hydrofining of distillates having high nitrogen content and low sulfur content, but also with respect to the hydrofining of inferior distillates having high sulfur content.

We claim:

1. A hydrofining catalyst having the following composition, based on the total weight of the catalyst composition: 1–5% (wt. %) nickel oxide, 12–35% (wt. %) tungsten oxide, 1–9 (wt. %) fluorine, and the remainder composite alumina as a carrier, wherein said composite alumina is obtained by shaping and calcining a mixture of a precursor or precursors of one or more kinds of micropore alumina and a precursor or precursors of one or more kinds of macropore alumina, wherein the weight ratio of micropore alumina to macropore alumina in the calcined composite alumina is 75:25 to 50:50, said micropore alumina has a pore distribution in which the pores of diameter less than 80 Angstroms occupy more than 95% of the total pore volume of said micropore alumina, while said macropore alumina is an alumina in which pores of diameter 60–600 Angstroms occupy more than 70% of the total pore volume of said macropore alumina, the pore distribution mentioned above being determined by the BET method of nitrogen absorption at low temperature.

2. A catalyst according to claim 1, wherein said mixture of precursors provide essentially only one kind of micropore alumina and one kind of macropore alumina.

3. A catalyst according to claim 1, wherein said precursor of said micropore alumina is a hydrated alumina with a boehmite content more than 60% (wt), and said precursor of said macropore alumina is a hydrated alumina with a boehmite content of more than 50% (wt).

4. A catalyst according to claim 1, wherein said composite alumina has a pore distribution wherein the volume of pores of diameter 40–100 angstroms occupies more than 75% of its total pore volume.

5. A catalyst according to claim 1, wherein the specific surface area of said composite alumina is greater than 200 m$^2$/g and the pore volume of said composite alumina is greater than 0.4 ml/g.

6. A process for the preparation of the catalyst as claimed in claim 1, comprising shaping and calcining the mixture of the precursor of micropore alumina and the precursor of macropore alumina to obtain said composite alumina as the carrier, and then sequentially impregnating the obtained composite alumina with an aqueous solution containing fluorine and an aqueous solution containing nickel-tungsten, and drying and calcining after each impregnation.

7. A process according to claim 6, wherein the precursor of said micropore alumina is a hydrated alumina with boehmite content more than 60% (wt).

8. A process according to claim 7, wherein said hydrated alumina is prepared by the sodium meta-aluminate-carbon dioxide method.

9. A process according to claim 1, wherein the precursor of said macropore alumina is a hydrated alumina with bochmite content more than 50% (wt).

10. A process according to claim 9, wherein said hydrated alumina is prepared by the sodium meta-aluminate-aluminium sulfate method.

11. The catalyst prepared by the process as claimed in claim 6.

12. A catalyst according to claim 1, wherein said shaping is carried out by extruding.

13. A catalyst according to claim 12, wherein the mixture of the micropore alumina precursor and the macropore alumina precursor is admixed with an extruding aid, a binding agent and water before extruding the resulting mixture.

* * * * *

UNITED STATES PATENT AND TRADEMARK OFFICE
CERTIFICATE OF CORRECTION

PATENT NO. : 5, 914,290
DATED : June 22, 1999
INVENTOR(S) : Yahua Shi; Dadong Li; Xuefen Liu; Hong Nie; Xiaodong Gao; Yibing Ying. All of Beijing, China It is certified that error appears in the above-identified patent and that said Letters Patent is hereby corrected as shown below:

On title page, item 73, after "Petroleum" insert - - Processing Sinopec - -.

Signed and Sealed this

Twentieth Day of June, 2000

Attest:

Q. TODD DICKINSON

*Attesting Officer*  *Director of Patents and Trademarks*